US008242181B2

(12) United States Patent
Zhu

(10) Patent No.: US 8,242,181 B2
(45) Date of Patent: Aug. 14, 2012

(54) ALUMINUM OXIDE DISPERSION AND METHOD OF PREPARING SAME

(75) Inventor: Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 154 days.

(21) Appl. No.: 12/676,430

(22) PCT Filed: Sep. 3, 2008

(86) PCT No.: PCT/US2008/075090
§ 371 (c)(1),
(2), (4) Date: Mar. 4, 2010

(87) PCT Pub. No.: WO2009/051905
PCT Pub. Date: Apr. 23, 2009

(65) Prior Publication Data
US 2010/0184904 A1  Jul. 22, 2010

Related U.S. Application Data

(60) Provisional application No. 60/979,440, filed on Oct. 12, 2007.

(51) Int. Cl.
C09C 1/40 (2006.01)
(52) U.S. Cl. ............ 516/34; 516/94; 106/401; 423/626; 423/625; 427/391; 524/430
(58) Field of Classification Search .................. 516/34, 516/94; 524/430; 106/401; 423/625, 626; 428/391
See application file for complete search history.

(56) References Cited

U.S. PATENT DOCUMENTS

| | | | |
|---|---|---|---|
| 2,915,475 A | 12/1959 | Bugosh et al. |
| 3,031,417 A | 4/1962 | Bruce et al. |
| 3,419,593 A | 12/1968 | Willing et al. |
| 3,445,420 A | 5/1969 | Kookootsedes et al. |
| 3,790,495 A | 2/1974 | Podschus et al. |
| 4,087,585 A | 5/1978 | Schulz |
| 4,260,780 A | 4/1981 | West |
| 4,273,697 A | 6/1981 | Sumimura et al. |
| 4,276,424 A | 6/1981 | Peterson, Jr. et al. |
| 4,314,956 A | 2/1982 | Baney et al. |
| 4,324,901 A | 4/1982 | West et al. |
| 4,332,525 A | 6/1982 | Cheney, Jr. |
| 4,395,443 A | 7/1983 | Shimizu et al. |
| 4,460,639 A | 7/1984 | Chi et al. |
| 4,460,640 A | 7/1984 | Chi et al. |
| 4,500,447 A | 2/1985 | Kobayashi et al. |
| 4,510,094 A | 4/1985 | Drahnak et al. |
| 4,530,879 A | 7/1985 | Drahnak et al. |
| 4,568,566 A | 2/1986 | Tolentino |
| 4,766,176 A | 8/1988 | Lee et al. |
| 4,916,169 A | 4/1990 | Boardman et al. |
| 5,017,654 A | 5/1991 | Togashi et al. |
| 5,178,849 A | 1/1993 | Bauer |
| 5,194,649 A | 3/1993 | Okawa |
| 5,256,480 A | 10/1993 | Inoue et al. |
| 5,278,272 A | 1/1994 | Lai et al. |
| 5,283,309 A | 2/1994 | Morita |
| 5,310,843 A | 5/1994 | Morita |
| 5,358,983 A | 10/1994 | Morita |
| 5,468,826 A | 11/1995 | Gentle et al. |
| 5,468,827 A | 11/1995 | Morita |
| 5,486,588 A | 1/1996 | Morita |
| 5,496,961 A | 3/1996 | Dauth |
| 5,530,075 A | 6/1996 | Morita |
| 5,738,976 A | 4/1998 | Okinoshima et al. |
| 5,747,608 A | 5/1998 | Katsoulis et al. |
| 5,794,649 A | 8/1998 | Spear et al. |
| 5,824,761 A | 10/1998 | Bujanowski et al. |
| 5,861,467 A | 1/1999 | Bujanowski et al. |
| 5,959,038 A | 9/1999 | Furukawa et al. |
| 5,972,512 A | 10/1999 | Boisvert et al. |
| 6,046,283 A | 4/2000 | Katsoulis et al. |
| 6,204,301 B1 | 3/2001 | Oshima et al. |
| 6,287,639 B1 | 9/2001 | Schmidt et al. |
| 6,310,146 B1 | 10/2001 | Katsoulis et al. |
| 6,352,610 B1 | 3/2002 | Schmidt et al. |
| 6,368,535 B1 | 4/2002 | Katsoulis et al. |
| 6,378,599 B1 | 4/2002 | Schmidt et al. |
| 6,451,869 B1 | 9/2002 | Butts |
| 6,656,425 B1 | 12/2003 | Benthien et al. |
| 6,660,395 B2 | 12/2003 | McGarry et al. |
| 6,689,859 B2 | 2/2004 | Li et al. |

(Continued)

FOREIGN PATENT DOCUMENTS

CN  100357088 C  12/2007

(Continued)

OTHER PUBLICATIONS

English language abstract for CN 100357088 extracted from the espacenet.com database on May 25, 2012, 14 pages.
English language abstract for DE 19915378 extracted from the espacenet.com database on May 25, 2012, 11 pages.
English language abstract for WO 2007013135 extracted from the espacenet.com database on May 25, 2012, 27 pages.
Guo, Andrew, et al., "Highly Active Visible-Light Photocatalysts for Curing a Ceramic Precursor," Chemical Materials, 1998, pp. 531-536, vol. 10, American Chemical Society.
Frogley, Mark D., "Mechanical Properties of carbon nanoparticle-reinforced elastomers," 2003, pp. 1647-1654, vol. 63, Elsevier Ltd.
Zhu, H.Y., "Nanophase and Nanocomposite Materials IV. Symposium," 2002, pp. 25-30, Materials Research Society, Warrendale, Pennsylvania, USA.
Reese, Herschel, "Development of Silicone Substrates to be Used with CIGS Deposition," 2005, Air Force Office of Scientific Research, Arlington, Virginia, USA.

(Continued)

Primary Examiner — Margaret Moore
(74) Attorney, Agent, or Firm — Howard & Howard Attorneys PLLC

(57) ABSTRACT

An aluminum oxide dispersion comprising from 30 to 99.9% (w/w) of a solvent; and from 0.1 to 70% (w/w) of aluminum oxide nanofibers suspended in the solvent, wherein the nanofibers comprise from 0 to 99.99% (w/w) of γ-AlO(OH) and from 0.01 to 100% (w/w) of γ-Al$_2$O$_3$; and a method of preparing the aluminum oxide dispersion.

15 Claims, 1 Drawing Sheet

U.S. PATENT DOCUMENTS

| | | |
|---|---|---|
| 6,831,145 B2 | 12/2004 | Kleyer et al. |
| 6,838,005 B2 | 1/2005 | Tepper et al. |
| 6,881,490 B2 * | 4/2005 | Kambe et al. ............ 428/447 |
| 7,037,592 B2 | 5/2006 | Zhu et al. |
| 7,189,775 B2 | 3/2007 | Tang et al. |
| 7,381,470 B2 | 6/2008 | Suto et al. |
| 7,704,315 B2 * | 4/2010 | Oswald et al. ............ 106/436 |
| 7,799,842 B2 | 9/2010 | Anderson et al. |
| 2003/0213939 A1 | 11/2003 | Narayan et al. |
| 2003/0229151 A1 | 12/2003 | Hurlburt et al. |
| 2004/0126526 A1 | 7/2004 | Parsonage et al. |
| 2005/0228073 A1 * | 10/2005 | Nishio et al. ............ 523/200 |
| 2009/0005499 A1 | 1/2009 | Fisher et al. |
| 2009/0090413 A1 | 4/2009 | Katsoulis et al. |
| 2009/0155577 A1 | 6/2009 | Anderson et al. |
| 2009/0200942 A1 | 8/2009 | Sasaki et al. |

FOREIGN PATENT DOCUMENTS

| | | |
|---|---|---|
| DE | 19915378 A1 | 10/2000 |
| EP | 0562922 B1 | 5/1997 |
| EP | 1391492 B1 | 6/2006 |
| GB | 1022944 | 6/1964 |
| WO | WO 9417003 | 8/1994 |
| WO | WO 2004060472 A1 | 7/2004 |
| WO | WO 2004106420 A2 | 12/2004 |
| WO | WO 2005114324 A2 | 12/2005 |
| WO | WO 2006088645 A1 | 8/2006 |
| WO | WO 2006088646 A1 | 8/2006 |
| WO | WO 2007013135 A1 | 2/2007 |
| WO | WO 2007018756 A1 | 2/2007 |
| WO | WO 2007/092118 A2 | 8/2007 |
| WO | WO 2007/097835 A2 | 8/2007 |
| WO | WO 2007/121006 A2 | 10/2007 |
| WO | WO 2007/123901 A1 | 11/2007 |
| WO | WO 2008/013611 A1 | 1/2008 |
| WO | WO 2008/045104 A2 | 4/2008 |
| WO | WO 2008/051242 A2 | 5/2008 |
| WO | WO 2009/007786 A2 | 1/2009 |

* cited by examiner

ALUMINUM OXIDE DISPERSION AND METHOD OF PREPARING SAME

CROSS REFERENCE TO RELATED APPLICATIONS

This application is a U.S. national stage filing under 35 U.S.C. §371 of PCT Application No. PCT/US08/75090 filed on 3 Sep. 2008, currently pending, which claims the benefit of U.S. Provisional Patent Application No. 60/979,440 filed 12 Oct. 2007 under 35U.S.C. §119 (e). PCT Application No. PCT/US08/75090 and U.S. Provisional Patent Application No. 60/979,440 are hereby incorporated by reference.

FIELD OF THE INVENTION

The present invention relates to an aluminum oxide dispersion and more particularly to a dispersion comprising from 30 to 99.9% (w/w) of a solvent; and from 0.1 to 70% (w/w) of aluminum oxide nanofibers suspended in the solvent, wherein the nanofibers comprise from 0 to 99.99% (w/w) of γ-AlO(OH) and from 0.01 to 100% (w/w) of γ-$Al_2O_3$. The present invention also relates to a method of preparing the aluminum oxide dispersion.

BACKGROUND OF THE INVENTION

The various modifications of aluminum hydroxides have widespread commercial applications. For example aluminum hydroxides are useful as flame retardants, filter media, reinforcement fillers in plastics and adhesives, filler pigments, catalysts, ingredients of paper coatings, catalyst supports, precursors for the production of activated alumina, and as raw materials for the production of aluminum.

The best defined crystalline forms of aluminum hydroxides are the trihydroxides, $Al(OH)_3$, including gibbsite, bayerite, and nordstrandite; and two modifications of aluminum oxide hydroxide, AlO(OH): boehmite (γ-aluminum oxide hydroxide) and diaspore (α-aluminum oxide hydroxide). Moreover, methods of producing fibrous forms of aluminum hydroxides are known in the art. For example, U.S. Pat. No. 2,915,475 to Bugosh discloses fibrous alumina in the form of fibrils having an average length in the range from 100 to 700 millimicrons, the remaining average dimensions being in the range from 3 to 10 millimicrons, the axial ratio being from 50:1 to 150:1, and the product having the following physical properties: surface area 250 to 350 $m^2/g$, X-ray of boehmite and the ratio of peak intensities of the product to boehmite of a surface of less than 10 $m^2/g$ at the 020 crystal lattice plane being less than 40:100.

U.S. Pat. No. 3,031,417 Wilkinson discloses a process for making fibrous alumina monohydrate aquasols comprising the steps of mixing a solution of alum with a solution of a soluble carbonate while maintaining a mole ratio of carbonate ions to aluminum of from about 1.50 to 1.90 so as to form carbonated, hydrated alumina gel having an activity, θ, such that the time in minutes required to depolymerize one-half of a sample of such gel in excess 0.50 N acetic acid at 30° C. is less than, 300 minutes, washing the gel with water until the gel contains a mole ratio of sulfate ions to aluminum of less than about 0.01:1 and a mole ratio of cations to aluminum of less than about 0.04:1, mixing the gel with a weak monobasic organic acid selected from the group consisting of acetic and formic acid so as to obtain an initial concentration of 5 to 10% $Al_2O_3$ and a mole ratio of aluminum to acid anion of from about 0.50:1 to 4.0:1, and heating the mixture of gel and acid under autogenous pressure to from about 140 to 180° C. for from about 10 minutes to 7 hours. The '417 patent further teaches that X-ray diffraction of the fibrils discloses that they have the X-ray diffraction of boehmite.

U.S. Pat. No. 6,838,005 B2 to Tepper et al. discloses a method of making a non-woven electropositive filler, the method comprising obtaining an aluminum source; reacting said aluminum source in an aqueous solution at a temperature sufficient to form non-spherical nano alumina particles; mixing the non-spherical nano alumina particles with a second solid, wherein mixing is effected substantially simultaneously with reacting so that the aluminum source is reacted in the presence of the second solid. The '005 patent also teaches the fibers are comprised of alumina, with various contents of combined water to result in compositions of pure $Al(OH)_3$ or AlO(OH), or mixtures of the two, with possible impurities of gamma and alpha alumina.

Although the aforementioned references disclose fibrous forms of aluminum trihydroxide, $Al(OH)_3$, and the modification of aluminum oxide hydroxide, AlO(OH), known as boehmite, they do not teach or suggest an aluminum oxide dispersion comprising a solvent and aluminum oxide nanofibers suspended in the solvent, wherein the nanofibers comprise from 0 to 99.99% (w/w) of γ-AlO(OH) and from 0.01 to 100% (w/w) of γ-$Al_2O_3$.

SUMMARY OF THE INVENTION

The present invention is directed to an aluminum oxide dispersion comprising:
 (A) from 30 to 99.9% (w/w) of a solvent; and
 (B) from 0.1 to 70% (w/w) of aluminum oxide nanofibers suspended in the solvent, wherein the nanofibers comprise from 0 to 99.99% (w/w) of γ-AlO(OH) and from 0.01 to 100% (w/w) of γ-$Al_2O_3$.

The present invention is also directed to a method of preparing an aluminum oxide dispersion, comprising:
 (i) heating a mixture comprising aluminum oxide fibers comprising from 0 to 99.99% (w/w) of γ-AlO(OH) and from 0.01 to 100% (w/w) of γ-$Al_2O_3$, water, and a carboxylic acid to produce a dispersion and a residue, wherein the dispersion comprises aluminum oxide nanofibers suspended in the water; and
 (ii) separating the dispersion from the residue.

The aluminum oxide dispersion of the present invention comprises nanofibers comprising both γ-AlO(OH) and γ-$Al_2O_3$ suspended in a solvent. The solvent can be water, an organic solvent, or a mixture of water and an organic solvent. Moreover, the dispersion is typically stable, i.e., the dispersion does not form sediment visible to the unaided eye when kept at room temperature (~23±2° C.) without agitation for a period of at least 2 months. Further, the dispersion is stable in the absence of an acid stabilizer. Still further, compared to boehmite fibers, the nanofibers of the instant invention have greater thermal stability, i.e., they do not convert to other crystalline forms of aluminum oxide at temperatures less than about 500° C.

The aluminum oxide dispersion of the present invention has numerous uses. In particular, the dispersion can be blended with thermoplastic and thermosetting polymers to form reinforced products having low coefficient of thermal expansion, low modulus, and high hardness.

DETAILED DESCRIPTION OF THE INVENTION

Figure 1:
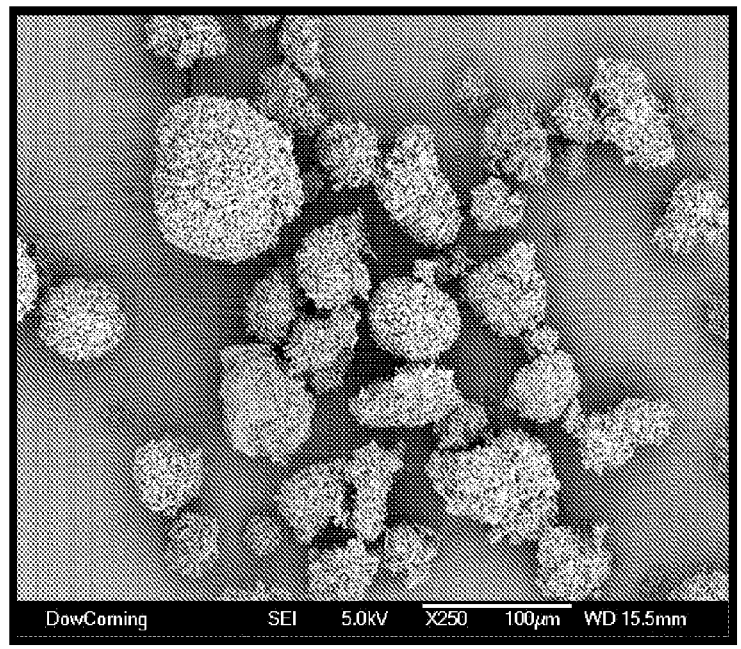
FIG. 1 shows a scanning electron micrograph of the aluminum oxide fibers used to prepare the aluminum oxide dispersions in the Examples.

As used herein, the term "boehmite" refers to gamma aluminum oxide hydroxide having the formula γ-AlO(OH), and vice-versa.

An aluminum oxide dispersion according to the present invention, comprises:
(A) from 30 to 99.9% (w/w) of a solvent; and
(B) from 0.1 to 70% (w/w) of aluminum oxide nanofibers suspended in the solvent, wherein the nanofibers comprise from 0 to 99.99% (w/w) of γ-AlO(OH) and from 0.01 to 100% (w/w) of γ-$Al_2O_3$.

Component (A) of the aluminum oxide dispersion is at least one solvent. The solvent can be water, an organic solvent, or a mixture of water and an organic solvent. The organic solvent can be any nonpolar or polar (protic, aprotic, or dipolar aprotic) solvent that does not react with the aluminum oxide nanofibers or adversely affect the stability of the dispersion. Furthermore, the organic solvent may be completely miscible, partially miscible, or immiscible with water.

Examples of solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; halogenated aromatic hydrocarbons such as bromobenzene and chlorobenzene; alcohols such as methanol, ethanol, 1-propanol, 2-propanol, 1-butanol, 2-butanol, 2-methyl-1-butanol, 1,1-dimethyl-1-ethanol, pentanol, hexanol, cyclohexanol, hepatanol, and octanol; and water. Moreover, Component (A) can be a single solvent or a mixture comprising two or more different solvents, each as described and exemplified above.

The concentration of component (A) is typically from 30 to 99.9% (w/w), alternatively from 50 to 99% (w/w), alternatively from 80 to 98% (w/w), based on the total weight of the aluminum oxide dispersion.

Component (B) of the aluminum oxide dispersion is aluminum oxide nanofibers. As used herein, the term "aluminum oxide nanofibers" refers to aluminum oxide fibrils and aggregates of fibrils having an average width less than about 400 nm, as determined by transmission electron microscopy (TEM) using the methods described in the Examples section below. The aluminum oxide nanofibers may comprise fibrils, or a mixture of fibrils and aggregates, as determined by TEM. The term "fibril" refers to fibers which appear to be singular, i.e., do not appear to have a substructure when viewed by TEM. The aggregates contain two or more associated fibrils. Moreover, the fibrils within an aggregate are typically aligned substantially parallel to one another. As used herein, the term "suspended" means the nanofibers are distributed throughout the solvent in the absence of agitation at room temperature.

The fibrils typically have an average width of from 1 to 20 nm, alternatively from 1 to 10 nm, alternatively from 2 to 6 nm, where the width of a fibril is the maximum diameter of the fibril.

The aggregates typically have an average width of from 4 to 400 nm, alternatively from 10 to 300 nm, alternatively from 50 to 200 nm, where the width of an aggregate is the maximum dimension of the aggregate measured perpendicular to the longitudinal axes of the fibrils.

The nanofibers typically comprise from 0 to 99.99% (w/w) of γ-AlO(OH) and from 0.01 to 100% (w/w) of γ-$Al_2O_3$, alternatively from 30 to 99% (w/w) of γ-AlO(OH) and from 1 to 70% (w/w) of γ-$Al_2O_3$, alternatively from 80 to 95% (w/w) of γ-AlO(OH) and from 5 to 20% (w/w) of γ-$Al_2O_3$, based on the total (dry) weight of the nanofibers, as determined by X-ray diffraction. Also, the sum of the percent by weight of γ-AlO(OH) and percent by weight of γ-$Al_2O_3$ is 100% (w/w). The dry weight of the aluminum oxide nanofibers may be determined by heating a sample of the dispersion under atmospheric pressure at temperature of 150° C. for 1 h to remove the solvent.

The aluminum oxide nanofibers can be untreated nanofibers, described above, or treated nanofibers prepared by treating the aforementioned dispersion comprising aluminum oxide nanofibers with an organosilicon compound. The organosilicon compound can be any of the organosilicon compounds typically used to treat silica fillers, with the exception of compounds such as halosilanes that react with water to produce a strong acid. Suitable organosilicon compounds and methods of treating the dispersion are as described below in the method of preparing the aluminum oxide dispersion of the present invention.

Figure 2:
FIG. 2 shows a transmission electron micrograph of aluminum oxide nanofibers according to the present invention.

Examples of aluminum oxide nanofibers include, but are not limited to, nanofibers containing 96% (w/w) of γ-AlO(OH) and 4% (w/w) of γ-$Al_2O_3$, shown in FIG. 2, nanofibers containing 99% (w/w) of γ-AlO(OH) and 1% (w/w) of γ-$Al_2O_3$, nanofibers containing 80% (w/w) of γ-AlO(OH) and 20% (w/w) of γ-$Al_2O_3$, and treated nanofibers prepared by treating the aforementioned aluminum oxide nanofibers with an organosilicon compound.

Component (B) can be a single type of nanofiber or a mixture comprising nanofibers that differ in at least one of the following properties: size, shape, proportion by weight of γ-AlO(OH) and γ-$Al_2O_3$, or type or extent of treatment.

The concentration of component (B) is typically from 0.1 to 70% (w/w), alternatively from 0.5 to 50% (w/w), alternatively from 1 to 20% (w/w), based on the total weight of the aluminum oxide dispersion. The weight of component (B) can be determined by heating a sample of the dispersion under atmospheric pressure at temperature of 150° C. for 1 h to remove the solvent.

The aluminum oxide nanofibers of the dispersion can be prepared as described below in the method of preparing the aluminum oxide dispersion of the present invention.

The aluminum oxide dispersion can comprise additional ingredients, provided the ingredient does not adversely affect the stability of the dispersion. Examples of additional ingredients include, but are not limited to, dispersing agents and carboxylic acids.

The aluminum oxide dispersion can further comprise at least one dispersing agent that promotes the formation of the dispersion, described below, and/or stabilizes the dispersion. Examples of dispersing agents include, but are not limited to, surfactants and silicone resins. The surfactant can be any anionic, cationic, nonionic, or zwitterionic surfactant typically employed to prepare and/or stabilize emulsions. Examples of anionic surfactants include, but are not limited to, alkyl carboxylates such as sodium and potassium stearate and sodium myristate; unsaturated carboxylates such as sodium oleate; ethoxy carboxylates; alkyl sulfates such as sodium dodecyl sulfate; alcohol ether sulfates such as sodium dodecyl 3-mole ether sulfate; alkyl aryl sulfonates such as sodium alkyl benzene sulfonates; naphthalene and alkyl naphthalene sulfonates; ethoxy sulfonates such as sodium nonyl phenol 2-mole ethoxylate ethane sulfonate; α-olefin sulfonates; sulfosuccinates such as sodium di(2-ethylhexyl) sulfosuccinate; alkyl phosphates; and alkyl ether phosphates.

Examples of cationic surfactants include, but are not limited to, alkyl trimethyl ammonium chlorides, dialkyl dimethyl ammonium chlorides, alkyl dimethyl benzyl ammonium chlorides; and polyethylene oxide modified cationic surfactants such as dodecyl methyl polyethylene oxide ammonium chloride.

Examples of nonionic surfactants include, but are not limited to, alcohol ethoxylates such as hexaoxyethylene glycol monoether, polyoxyethylene cetyl ether, polyoxyethylene lauryl ether, and polyoxyethylene stearyl ether; alkyl phenol ethoxylates; fatty acid ethoxylates such as glycerin monostearate and polyoxyethylene stearate; monoalkanolamide ethoxylates; sorbitan esters such as sorbitan monopalmitate and the surfactants sold under the name Span® (ICI); sorbitan ester ethoxylates such as polyoxyethylene sorbitan monolaurate and the surfactants sold under the name Tween® (ICI); amine ethoxylates; ethylene oxide-propylene oxide copolymers such as the surfactants sold under the names Pluronics (Wyandotte) and Synperonic PE (ICI); glycol esters; glycerol and polyglycerol esters; glucosides and polyglucosides; sucrose esters, and modified silicone oils containing polyoxyethylene groups.

Examples of zwitterionic surfactants include, but are not limited to, aminocarboxylic acids; N-alkyl betaines such as lauryl amido propyl dimethyl betaine; N-alkyl amino propionates; sulfobetaines; and N-alkyl amino dipropionates.

The concentration of the surfactant is typically from 0.1 to 20% (w/w), alternatively from 0.5 to 15% (w/w), alternatively from 1 to 5% (w/w), based on the total weight of the aluminum oxide dispersion.

The dispersing agent can also be at least one silicone resin. The silicone resin is typically a copolymer containing T units, T and Q siloxane units, or T and/or Q siloxane units in combination with M and/or D siloxane units.

The silicone resin typically has a number-average molecular weight ($M_n$) of from 500 to 50,000, alternatively from 500 to 10,000, alternatively 1,000 to 3,000, where the molecular weight is determined by gel permeation chromatography employing a low angle laser light scattering detector, or a refractive index detector and silicone resin (MQ) standards.

The viscosity of the silicone resin at 25° C. is typically from 0.01 to 100,000 Pa·s, alternatively from 0.1 to 10,000 Pa·s, alternatively from 1 to 100 Pa·s.

According to a first embodiment, the silicone resin has the formula $(R^1R^2_2SiO_{1/2})_w (R^2_2SiO_{2/2})_x(R^2SiO_{3/2})_y(SiO_{4/2})_z$ (I), wherein each $R^1$ is independently $C_1$ to $C_{10}$ hydrocarbyl or $C_1$ to $C_{10}$ halogen-substituted hydrocarbyl, both free of aliphatic unsaturation, each $R^2$ is independently $R^1$ or alkenyl, w is from 0 to 0.95, x is from 0 to 0.95, y is from 0 to 1, z is from 0 to 0.9, y+z is from 0.1 to 1, and w+x+y+z=1, provided the silicone resin has an average of at least two silicon-bonded alkenyl groups per molecule.

The hydrocarbyl and halogen-substituted hydrocarbyl groups represented by $R^1$ are free of aliphatic unsaturation and typically have from 1 to 10 carbon atoms, alternatively from 1 to 6 carbon atoms. Acyclic hydrocarbyl and halogen-substituted hydrocarbyl groups containing at least 3 carbon atoms can have a branched or unbranched structure. Examples of hydrocarbyl groups represented by $R^1$ include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; and aralkyl, such as benzyl and phenethyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

The alkenyl groups represented by $R^2$, which may be the same or different, typically have from 2 to about 10 carbon atoms, alternatively from 2 to 6 carbon atoms, and are exemplified by, but not limited to, vinyl, allyl, butenyl, hexenyl, and octenyl.

In the formula (I) of the silicone resin, the subscripts w, x, y, and z are mole fractions. The subscript w typically has a value of from 0 to 0.95, alternatively from 0 to 0.8, alternatively from 0 to 0.2; the subscript x typically has a value of from 0 to 0.95, alternatively from 0 to 0.8, alternatively from 0 to 0.5; the subscript y typically has a value of from 0 to 1, alternatively from 0.3 to 1, alternatively from 0.5 to 1; the subscript z typically has a value of from 0 to 0.9, alternatively from 0 to 0.5, alternatively from 0 to 0.1; and the sum y+z typically has value of from 0.1 to 1, alternatively from 0.2 to 1, alternatively from 0.5 to 1, alternatively 0.8 to 1.

Typically at least 50 mol %, alternatively at least 65 mol %, alternatively at least 80 mol % of the groups $R^2$ in the silicone resin are alkenyl. The term "mol % of the groups $R^2$ in the silicone resin are alkenyl" is defined as the ratio of the number of moles of silicon-bonded alkenyl groups in the silicone resin to the total number of moles of the groups $R^2$ in the resin, multiplied by 100.

The silicone resin typically contains less than 10% (w/w), alternatively less than 5% (w/w), alternatively less than 2% (w/w), of silicon-bonded hydroxy groups, as determined by $^{29}Si$ NMR.

Examples of silicone resins having the formula (I) include, but are not limited to, resins having the following formulae: $(Vi_2MeSiO_{1/2})_{0.25}(PhSiO_{3/2})_{0.75}$, $(ViMe_2SiO_{1/2})_{0.25}(PhSiO_{3/2})_{0.75}$, $(ViMe_2SiO_{1/2})_{0.25}(MeSiO_{3/2})_{0.25}(PhSiO_{3/2})_{0.50}$, $(ViMe_2SiO_{1/2})_{0.15}(PhSiO_{3/2})_{0.75}(SiO_{4/2})_{0.1}$, and $(Vi_2MeSiO_{1/2})_{0.15}(ViMe_2SiO_{1/2})_{0.1}(PhSiO_{3/2})_{0.75}$, where Me is methyl, Vi is vinyl, Ph is phenyl, and the numerical subscripts outside the parenthesis denote mole fractions. Also, in the preceding formulae, the sequence of units is unspecified.

Methods of preparing silicone resins containing silicon-bonded alkenyl groups are well known in the art; many of these resins are commercially available. These resins are typically prepared by cohydrolyzing the appropriate mixture of chlorosilane precursors in an organic solvent, such as toluene. For example, a silicone resin consisting essentially of $R^1R^2_2SiO_{1/2}$ units and $R^2SiO_{3/2}$ units can be prepared by cohydrolyzing a compound having the formula $R^1R^2_2SiCl$ and a compound having the formula $R^2SiCl_3$ in toluene, where $R^1$ and $R^2$ are as defined and exemplified above. The aqueous hydrochloric acid and silicone hydrolyzate are separated and the hydrolyzate is washed with water to remove residual acid and heated in the presence of a mild condensation catalyst to "body" the resin to the requisite viscosity. If desired, the resin can be further treated with a condensation catalyst in an organic solvent to reduce the content of silicon-bonded hydroxy groups. Alternatively, silanes containing hydrolysable groups other than chloro, such —Br, —I, —$OCH_3$, —$OC(O)CH_3$, —$N(CH_3)_2$, $NHCOCH_3$, and —$SCH_3$, can be utilized as starting materials in the cohydrolysis reaction. The properties of the resin products depend on the types of silanes, the mole ratio of silanes, the degree of condensation, and the processing conditions.

According to a second embodiment, the silicone resin has the formula $(R^1R^3{}_2SiO_{1/2})_w$ $(R^3{}_2SiO_{2/2})_x(R^3SiO_{3/2})_y$ $(SiO_{4/2})_z$ (II), wherein each $R^1$ is independently $C_1$ to $C_{10}$ hydrocarbyl or $C_1$ to $C_{10}$ halogen-substituted hydrocarbyl, both free of aliphatic unsaturation, each $R^3$ is independently $R^1$ or —H, w is from 0 to 0.95, x is from 0 to 0.95, y is from 0 to 1, z is from 0 to 0.9, y+z is from 0.1 to 1, and w+x+y+z=1, provided the silicone resin has an average of at least two silicon-bonded hydrogen atoms per molecule. In the formula (II), $R^1$, w, x, y, z, and y+z are as described and exemplified above for the silicone resin having the formula (I).

Typically at least 50 mol %, alternatively at least 65 mol %, alternatively at least 80 mol % of the groups $R^3$ in the silicone resin are hydrogen. The term "mol % of the groups $R^3$ in the silicone resin are hydrogen" is defined as the ratio of the number of moles of silicon-bonded hydrogen atoms in the silicone resin to the total number of moles of the groups $R^3$ in the resin, multiplied by 100.

The silicone resin typically contains less than 10% (w/w), alternatively less than 5% (w/w), alternatively less than 2% (w/w), of silicon-bonded hydroxy groups, as determined by $^{29}$Si NMR.

Examples of silicone resins having the formula (II) include, but are not limited to, resins having the following formulae:
$(HMe_2SiO_{1/2})_{0.25}(PhSiO_{3/2})_{0.75}$, $(HMeSiO_{2/2})_{0.3}$ $(PhSiO_{3/2})_{0.6}(MeSiO_{3/2})_{0.1}$, and $(Me_3SiO_{1/2})_{0.1}(H_2SiO_{2/2})_{0.1}(MeSiO_{3/2})_{0.4}(PhSiO_{3/2})_{0.4}$, where Me is methyl, Ph is phenyl, and the numerical subscripts outside the parenthesis denote mole fractions. Also, in the preceding formulae, the sequence of units is unspecified.

Methods of preparing silicone resins containing silicon-bonded hydrogen atoms are well known in the art; many of these resins are commercially available. Silicone resins are typically prepared by cohydrolyzing the appropriate mixture of chlorosilane precursors in an organic solvent, such as toluene. For example, a silicone resin consisting essentially of $R^1R^3{}_2SiO_{1/2}$ units and $R^3SiO_{3/2}$ units can be prepared by cohydrolyzing a compound having the formula $R^1R^3{}_2SiCl$ and a compound having the formula $R^3SiCl_3$ in toluene, where $R^1$ and $R^3$ are as described and exemplified above. The aqueous hydrochloric acid and silicone hydrolyzate are separated and the hydrolyzate is washed with water to remove residual acid and heated in the presence of a mild non-basic condensation catalyst to "body" the resin to the requisite viscosity. If desired, the resin can be further treated with a non-basic condensation catalyst in an organic solvent to reduce the content of silicon-bonded hydroxy groups. Alternatively, silanes containing hydrolysable groups other than chloro, such —Br, —I, —OCH$_3$, —OC(O)CH$_3$, —N(CH$_3$)$_2$, NHCOCH$_3$, and —SCH$_3$, can be utilized as starting materials in the cohydrolysis reaction. The properties of the resin products depend on the types of silanes, the mole ratio of silanes, the degree of condensation, and the processing conditions.

According to a third embodiment, the silicone resin has the formula
$(R^4R^5{}_2SiO_{1/2})_w(R^5{}_2SiO_{2/2})_x$ $(R^5SiO_{3/2})_y(SiO_{4/2})_z$ (III),
wherein each $R^4$ is independently $C_1$ to $C_{10}$ hydrocarbyl or $C_1$ to $C_{10}$ halogen-substituted hydrocarbyl, each $R^5$ is independently $R^4$, —H, —OH, or a hydrolysable group, w is from 0 to 0.95, x is from 0 to 0.95, y is from 0 to 1, z is from 0 to 0.9, y+z is from 0.1 to 1, and w+x+y+z=1, provided the silicone resin has an average of at least two silicon-bonded hydrogen atoms, hydroxy groups, or hydrolysable groups per molecule. In the formula (III), w, x, y, z, and y+z are as described and exemplified above for the silicone resin having the formula (I).

The hydrocarbyl and halogen-substituted hydrocarbyl groups represented by $R^4$ typically have from 1 to 10 carbon atoms, alternatively from 1 to 6 carbon atoms, alternatively from 1 to 4 carbon atoms. Acyclic hydrocarbyl and halogen-substituted hydrocarbyl groups containing at least 3 carbon atoms can have a branched or unbranched structure. Examples of hydrocarbyl groups include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; aralkyl, such as benzyl and phenethyl; alkenyl, such as vinyl, allyl, and propenyl; arylalkenyl, such as styryl and cinnamyl; and alkynyl, such as ethynyl and propynyl. Examples of halogen-substituted hydrocarbyl groups include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

As used herein the term "hydrolysable group" means the silicon-bonded group reacts with water in either the presence or absence of a catalyst at any temperature from room temperature (~23±2° C.) to 100° C. within several minutes, for example thirty minutes, to form a silanol (Si—OH) group. Examples of hydrolysable groups represented by $R^5$ include, but are not limited to, —Cl, —Br, —OR$^6$, —OCH$_2$CH$_2$OR$^6$, CH$_3$C(=O)O—, Et(Me)C=N—O—, CH$_3$C(=O)N (CH$_3$)—, and —ONH$_2$, wherein $R^6$ is $C_1$ to $C_8$ hydrocarbyl or $C_1$ to $C_8$ halogen-substituted hydrocarbyl.

The hydrocarbyl and halogen-substituted hydrocarbyl groups represented by $R^6$ typically have from 1 to 8 carbon atoms, alternatively from 3 to 6 carbon atoms. Acyclic hydrocarbyl and halogen-substituted hydrocarbyl groups containing at least 3 carbon atoms can have a branched or unbranched structure. Examples of hydrocarbyl include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, and octyl; cycloalkyl, such as cyclopentyl, cyclohexyl, and methylcyclohexyl; phenyl; alkaryl, such as tolyl and xylyl; aralkyl, such as benzyl and phenethyl; alkenyl, such as vinyl, allyl, and propenyl; arylalkenyl, such as styryl; and alkynyl, such as ethynyl and propynyl. Examples of halogen-substituted hydrocarbyl groups include, but are not limited to, 3,3,3-trifluoropropyl, 3-chloropropyl, chlorophenyl, and dichlorophenyl.

Typically, at least 2 mol %, alternatively at least 10 mol %. alternatively at least 30 mol % of the groups $R^5$ in the silicone resin are hydrogen, hydroxy, or a hydrolysable group. The term "mol % of the groups $R^5$ in the silicone resin are in the silicone resin are hydrogen, hydroxy, or a hydrolysable group" is defined as the ratio of the number of moles of silicon-bonded hydrogen, hydroxy, or a hydrolysable groups in the silicone resin to the total number of moles of the groups $R^5$ in the resin, multiplied by 100.

Examples of silicone resins having the formula (III) include, but are not limited to, resins having the following formulae:
$(MeSiO_{3/2})_n$, $(PhSiO_{3/2})_n$, $(Me_3SiO_{1/2})_{0.8}(SiO_{4/2})_{0.2}$, $(MeSiO_{3/2})_{0.67}(PhSiO_{3/2})_{0.33}$, $(MeSiO_{3/2})_{0.45}(PhSiO_{3/2})_{0.40}(Ph_2SiO_{2/2})_{0.1}(PhMeSiO_{2/2})_{0.05}$, $(PhSiO_{3/2})_{0.4}(MeSiO_{3/2})_{0.45}(PhSiO_{3/2})_{0.1}(PhMeSiO_{2/2})_{0.05}$, and $(PhSiO_{3/2})_{0.4}(MeSiO_{3/2})_{0.1}(PhMeSiO_{2/2})_{0.5}$, where Me is methyl, Ph is phenyl, the numerical subscripts outside the parenthesis denote mole fractions, and the subscript n has a value such that the silicone resin has a weight-average molecular weight of from 500 to 1,000,000. Also, in the preceding formulae, the sequence of units is unspecified.

Methods of preparing silicone resins containing silicon-bonded hydrogen atoms, hydroxy groups, or hydrolysable groups are well known in the art; many of these resins are commercially available. Silicone resins are typically prepared by cohydrolyzing the appropriate mixture of silane precursors in an organic solvent, such as toluene. For example, a silicone resin can be prepared by cohydrolyzing a silane having the formula $R^4R^5{}_2SiX$ and a silane having the formula $R^5SiX_3$ in toluene, where $R^4$ is $C_1$ to $C_{10}$ hydrocarbyl or $C_1$ to $C_{10}$ halogen-substituted hydrocarby, $R^5$ is $R^4$, —H, or a hydrolysable group, and X is a hydrolysable group, provided when $R^5$ is a hydrolysable group, X is more reactive in the hydrolysis reaction than $R^5$. The aqueous hydrochloric acid and silicone hydrolyzate are separated and the hydrolyzate is washed with water to remove residual acid and heated in the presence of a mild condensation catalyst to "body" (i.e., condense) the resin to the requisite viscosity. If desired, the resin can be further treated with a condensation catalyst in an organic solvent to reduce the content of silicon-bonded hydroxy groups.

The silicone resin can be a single silicone resin or a mixture comprising two or more different silicone resins, each as described above.

The concentration of the silicone resin is typically from 0.1 to 60% (w/w), alternatively from 2 to 20% (w/w), alternatively from 5 to 10% (w/w), based on the total weight of the aluminum oxide dispersion.

As stated above, the aluminum oxide dispersion can further comprise at least one carboxylic acid. The carboxylic acid is as described and exemplified below in the method of preparing the aluminum oxide dispersion. The carboxylic acid can be a single carboxylic acid or a mixture comprising two or more different carboxylic acids.

The concentration of the carboxylic acid is typically from 0.1 to 40% (w/w), alternatively from 0.5 to 15% (w/w), alternatively from 2 to 10% (w/w), based on the total weight of the aluminum oxide dispersion.

A method of preparing an aluminum oxide dispersion according to the present invention, comprises:
(i) heating a mixture comprising aluminum oxide fibers comprising from 0 to 99.99% (w/w) of γAlO(OH) and from 0.01 to 100% (w/w) of $\gamma\text{-}Al_2O_3$, water, and a carboxylic acid to produce a dispersion and a residue, wherein the dispersion comprises aluminum oxide nanofibers suspended in the water; and
(ii) separating the dispersion from the residue.

In step (i) of the method of preparing the aluminum oxide dispersion, a mixture comprising aluminum oxide fibers comprising from 0 to 99.99% (w/w) of γ-AlO(OH) and from 0.01 to 100% (w/w) of $\gamma\text{-}Al_2O_3$, water, and a carboxylic acid is heated to produce a dispersion and a residue, wherein the dispersion comprises aluminum oxide nanofibers suspended in the water.

The mixture comprises aluminum oxide fibers comprising from 0 to 99.99% (w/w) of γ-AlO(OH) and from 0.01 to 100% (w/w) of $\gamma\text{-}Al_2O_3$, alternatively from 30 to 99% (w/w) of γ-AlO(OH) and from 1 to 70% (w/w) of $\gamma\text{-}Al_2O_3$, alternatively from 80 to 95% (w/w) of γ-AlO(OH) and from 5 to 20% (w/w) of $\gamma\text{-}Al_2O_3$, based on the total weight of the fibers, as determined using X-ray diffraction. Also, the sum of the percent by weight of γ-AlO(OH) and percent by weight of $\gamma\text{-}Al_2O_3$ is 100% (w/w).

As used herein, the term "aluminum oxide fibers" refers to aluminum oxide particles comprising fibers. The particles typically have a median particle size of from 0.1 to 400 μm, alternatively from 10 to 150 μm, Unlike the aluminum oxide nanofibers of the dispersion, described above, the aluminum oxide fibers will not remain suspended in a solvent without continuous agitation.

The aluminum oxide fibers of the present method can be prepared by heating aluminum hydroxide fibers comprising boehmite (γ-AlO(OH)), a mixture comprising boehmite and $\gamma\text{-}Al_2O_3$, or a mixture of boehmite and aluminum trihydroxide, $Al(OH)_3$, at a temperature of at least 450° C. As used herein, the term "aluminum hydroxide fibers" refers to aluminum hydroxide particles comprising fibers. The particles typically have a median particle size of from 0.1 to 400 μm, alternatively from 10 to 150 μm.

The aluminum hydroxide fibers are typically heated at a temperature of from 450 to 800° C. at atmospheric pressure for a sufficient time to convert any $Al(OH)_3$ to boehmite and at least a portion of the boehmite to $\gamma\text{-}Al_2O_3$. Alternatively, the aluminum hydroxide fibers can be heated at a temperature of from 400 to 600° C., alternatively from 450 to 550° C.

As the heating temperature increases in the range from 450 to 800° C. at a given time, the concentration of $\gamma\text{-}Al_2O_3$ in the aluminum oxide fibers increases. The heating time depends on the composition of the aluminum hydroxide fibers and the temperature. Typically, the aluminum hydroxide fibers are heated for 10 to 240 minutes at a temperature of from 450 to 800° C. to produce aluminum oxide fibers containing from 0.01 to 95% (w/w) of $\gamma\text{-}Al_2O_3$. Aluminum oxide fibers comprising boehmite and $\gamma\text{-}Al_2O_3$ are also sold commercially under the name NanoCeram® gamma alumina fibers by Argonide Corporation (Sanford, Fla.).

The aluminum hydroxide fibers can be prepared using a variety of methods known in the art. For example, the aluminum hydroxide fibers can be prepared by the electroplosion of aluminum wire under air or nitrogen as described in U.S. Pat. No. 6,838,005 B2; heating a carbonated, hydrated alumina gel with acetic or formic acid under autogenous pressure, as described in U.S. Pat. No. 3,031,417; or heating an aqueous dispersion of alumina in the presence of a strong acid, as described in U.S. Pat. No. 2,915,475. Aluminum hydroxide fibers comprising boehmite and $Al(OH)_3$ are also sold commercially under the name NanoCeram® boehmite fibers by Argonide Corporation (Sanford, Fla.).

The mixture comprises at least one carboxylic acid. The carboxylic acid is typically soluble in water or a mixture of water and a water-soluble alcohol. The carboxylic acid typically has from 1 to 6 carbon atoms. The carboxylic acid can be a monocarboxylic acid or a dicarboxylic acid.

Examples of carboxylic acids include, but are not limited to, monocarboxylic acids such as formic acid, acetic acid, trifluoroacetic acid, propionic acid; and dicarboxylic acids such as butyric acid, oxalic acid, malonic and, and succinic acid. The carboxylic acid can be a single carboxylic acid or a mixture comprising two or more different carboxylic acids, each as described above.

The mixture can further comprise at least one water-soluble alcohol, such as methanol, ethanol, and propanol.

The mixture can be heated in any standard reactor suitable for carrying out hydrolysis reactions under reflux conditions. Suitable reactors include glass and Teflon-lined glass reactors. Preferably, the reactor is equipped with a means of agitation, such as stirring. The mixture can be heated in air or an inert atmosphere, such as nitrogen or argon.

The aluminum oxide fibers, water, and carboxylic acid can be combined in any order. Typically, the aluminum oxide fibers are added to water with agitation, followed by the addition of acetic acid.

The concentration of the aluminum oxide fibers in the mixture is typically from 0.1 to 70% (w/w), alternatively from 1 to 50% (w/w), alternatively from 2 to 20% (w/w), based on the total weight of the mixture. The weight of the fibers can be determined by heating a sample of the mixture under atmospheric pressure at temperature of 150° C. for 1 h to remove the solvent.

The concentration of water in the mixture is such that the ratio of the weight of water to the weight of aluminum oxide fibers is typically from 0.5 to 1000, alternatively from 5 to 500, alternatively from 20 to 100.

The concentration of the carboxylic acid in the mixture is such that the ratio of the number of moles of carboxy groups ($-CO_2H$) in the acid to the number of moles of aluminum oxide fibers is typically from 0.1 to 20, alternatively from 0.5 to 10, alternatively from 1 to 5. As stated above, the aluminum oxide fibers comprise $\gamma$-AlO(OH) and $\gamma$-$Al_2O_3$. However, as used herein, the term "moles of aluminum oxide fibers" refers to the number of moles of aluminum oxide fibers, based on the simplified formula $Al_2O_3$.

The reaction is typically carried out at the boiling point of the mixture under reflux conditions at ambient pressure. When the temperature is less than the boiling point of the mixture, the rate of formation of the aluminum oxide dispersion is typically very slow.

The heating time depends on several factors, such as the mole ratio of carboxylic acid to aluminum oxide fibers, the weight ratio of water to aluminum oxide fibers, and the temperature. The time of reaction is typically from 1 to 164 h, alternatively from 10 to 48 h at a temperature equal to the boiling point of the mixture under ambient pressure. The optimum reaction time can be determined by routine experimentation using the methods set forth in the Examples section below.

In step (ii) of the method of preparing the aluminum oxide dispersion, the dispersion is separated from the residue. Examples of suitable methods include, but are not limited to, decanting, filtering, and centrifugation. For example, the dispersion can be separated from the residue by centrifuging the mixture at 2000 rpm (radius=6 in.) for 30 min.

The method of preparing the aluminum oxide dispersion can further comprise, after step (ii), diluting the separated dispersion with an organic solvent or replacing at least a portion of the water in the separated dispersion with an organic solvent (water-soluble or water-insoluble). The latter can be carried out by adding an organic solvent to the separated dispersion to form a second mixture, and distilling the resulting second mixture to remove at least a portion of the water. Alternatively, the water can be replaced after removing the carboxylic acid from the separated dispersion, described below.

The organic solvent can be any aprotic or dipolar aprotic organic solvent that is completely miscible, partially miscible, or immiscible with water, and does not react with the aluminum oxide dispersion under the conditions of the present method. Preferably, the organic solvent forms a minimum boiling azeotrope with water. If the organic solvent does not form an azeotrope with water, the organic solvent preferably has a boiling point greater than the boiling point of water. Otherwise, the organic solvent may be completely removed during the distillation. The organic solvent is as described and exemplified above for the dispersion of the present invention. The organic solvent can be a single organic solvent or a mixture comprising two or more different organic solvents, each as defined above.

The method of preparing the aluminum oxide dispersion can further comprise, after step (ii), removing the carboxylic acid from the separated dispersion. The carboxylic acid can be removed from the dispersion using conventional methods such as treating the dispersion with an anion exchange resin and distillation. For example, the carboxylic acid can be removed from the dispersion by distilling the dispersion and periodically adding water to the dispersion to restore the original volume. Alternatively, the carboxylic acid can be removed from the dispersion after replacing at least a portion of the water with an organic solvent.

The method of preparing the aluminum oxide dispersion can further comprise treating the separated dispersion with an organosilicon compound to produce treated aluminum oxide nanofibers. The organosilicon compound can be any of the organosilicon compounds commonly used to treat silica fillers, with the exception of halosilanes. Examples of organosilicon compounds include, but are not limited to, organosiloxanes such as hydroxy-endblocked dimethylsiloxane oligomer, hexamethyldisiloxane, and tetramethyldivinyldisiloxane; organosilazanes such as hexamethyldisilazane, hexamethylcyclotrisilazane; and organoalkoxysilanes such as methyltrimethoxysilane, vinyltrimethoxysilane, vinyltriethoxysilane, 3-glycidoxypropyltrimethoxysilane, and 3-methacryloxypropyltrimethoxysilane. The organosilicon compound can be a single organosilicon compound or a mixture comprising two or more different organosilicon compounds, each as described above.

The concentration of the organosilicon compound is such that the ratio of the weight of the organosilicon compound to the weight of the aluminum oxide nanofibers is typically from 0.01 to 10, alternatively from 0.1 to 5, alternatively from 0.5 to 2. The weight of the aluminum oxide nanofibers refers to the dry weight of the nanofibers obtained after heating a sample of the dispersion under atmospheric pressure at 150° C. for 1 h.

The separated dispersion containing the aluminum oxide nanofibers can be treated with the organosilicon compound by mixing the dispersion and the organosilicon compound at a moderate temperature. For example, the aforementioned components are typically mixed at a temperature of from 0 to 90° C. for a period of from 0.5 to 24 h.

Alternatively, the separated dispersion containing the aluminum oxide nanofibers can be treated with the organosilicon compound by mixing the aluminum oxide dispersion, the organosilicon compound, and a water-immiscible organic solvent, to produce an organic phase comprising the nanofibers and an aqueous phase; and separating the organic phase from the aqueous phase. The organic phase containing the aluminum oxide nanofibers can be separated from the aqueous phase by discontinuing agitation of the mixture, allowing the mixture to separate into two layers, and removing the aqueous or organic layer. Alternatively, the organic phase containing the aluminum oxide nanofibers can be separated from the aqueous phase by distilling the mixture to remove the water or the organic solvent.

The method of preparing the aluminum oxide dispersion can further comprise treating the separated dispersion with a dispersing agent. The dispersing agent is as described and exemplified above for the dispersion of the present invention. Alternatively, the dispersion can be treated with the dispersing agent after replacing at least a portion of the water and/or removing the carboxylic acid, described above.

The aluminum oxide dispersion of the present invention comprises nanofibers comprising both $\gamma$-AlO(OH) and $\gamma$-$Al_2O_3$ suspended in a solvent. The solvent can be water, an organic solvent, or a mixture of water and an organic solvent. Moreover, the dispersion is typically stable, i.e., the dispersion does not form sediment visible to the unaided eye when kept at room temperature (~23±2° C.) without agitation for a period of at least 2 months, Further, the dispersion is stable in the absence of an acid stabilizer. Still further, compared to boehmite fibers, the nanofibers of the instant invention have greater thermal stability, i.e., they do not convert to other crystalline forms of aluminum oxide at temperatures less than about 500° C.

The aluminum oxide dispersion of the present invention has numerous uses. In particular, the dispersion can be blended with thermoplastic and thermosetting polymers to

EXAMPLES

The following examples are presented to better illustrate the aluminum oxide dispersion and method of the present invention, but are not to be considered as limiting the invention, which is delineated in the appended claims. Unless otherwise noted, all percentages reported in the examples are by weight.

The mole ratio of acetic acid to aluminum oxide fibers was calculated by assuming the aluminum oxide fibers have the formula $Al_2O_3$.

A specimen of the aluminum oxide nanofibers for transmission electron microscopy was prepared by applying a diluted sample of the dispersion (1.0 g of dispersion diluted with 199.0 g of distilled water) to the specimen holder and allowing the water to evaporate under ambient conditions.

Aluminum oxide fibers are fibers prepared by heating NanoCeram® gamma alumina fiber nanopowder, sold by Argonide Corporation (Sanford, F), in air at about 500° C. for 1 h. The heat-treated fibers contained 96% (w/w) of γ-AlO(OH) and 4% (w/w) of γ-$Al_2O_3$, as determined by X-ray diffraction.

Example 1

Aluminum oxide fibers (2.0 g), 4.4 g of acetic acid, and 35.6 g of de-ionized water were combined in a 100 mL round bottom flask equipped with a condenser, a stirrer, and a heating mantle. The mole ratio of acetic acid to alumina fibers was 3.74. The mixture was heated to reflux with stirring. The mixture was heated at reflux for 120 hours and then allowed to cool to room temperature. The mixture was then centrifuged at 2000 rpm for 30 minutes. The supernatant dispersion was separated from the residue. Approximately, 20% (w/w) of the original solid was dispersed as discrete nanofibers in the aqueous solvent. A scanning electron micrograph of the aluminum oxide fibers is shown in FIG. 1. A transmission electron micrograph of the aluminum oxide nanofibers is shown in FIG. 2.

Example 2

Aluminum oxide fibers (2.0 g), 2.2 g of acetic acid, and 35.6 g of de-ionized water were combined in a 100 mL round bottom flask equipped with a condenser, a stirrer, and a heating mantle. The mole ratio of acetic acid to alumina fibers was 1.87. The mixture was heated to reflux with stirring. The mixture was heated at reflux for 120 hours and then allowed to cool to room temperature. The mixture was then centrifuged at 2000 rpm for 30 minutes. The supernatant dispersion was separated from the residue. Approximately, 32% (w/w) of the original solid was dispersed as discrete nanofibers in the aqueous solvent.

Example 3

Aluminum oxide fibers (2.0 g), 1.1 g of acetic acid, and 36.9 g of de-ionized water were combined in a 100 mL round bottom flask equipped with a condenser, a stirrer, and a heating mantle. The mole ratio of acetic acid to alumina fibers was 0.94. The mixture was heated to reflux with stirring. The mixture was heated at reflux for 120 hours and then allowed to cool to room temperature. The mixture was then centrifuged at 2000 rpm for 30 minutes. The supernatant dispersion was separated from the residue. Approximately, 71% (w/w) of the original solid was dispersed as discrete nanofibers in the aqueous solvent.

That which is claimed is:

1. An aluminum oxide dispersion comprising:
   (A) from 30 to 99.9% (w/w) of a solvent; and
   (B) from 0.1 to 70% (w/w) of aluminum oxide nanofibers suspended in the solvent, wherein:
   the aluminum oxide nanofibers comprise from 0 to 99.99% (w/w) of γ-AlO(OH) and from 0.01 to 100% (w/w) of γ-$Al_2O_3$,
   the aluminum oxide nanofibers comprise aluminum oxide fibrils and aluminum oxide aggregates with each aluminum oxide aggregate comprising two or more aluminum oxide fibrils, and
   the aluminum oxide aggregates have an average width of less than about 400 nm.

2. The dispersion according to claim 1, wherein the solvent is water.

3. The dispersion according to claim 1, wherein the solvent is an organic solvent.

4. The dispersion according to claim 1, wherein the solvent is a mixture comprising an organic solvent and water.

5. The dispersion according to claim 1, wherein the aluminum oxide nanofibers comprise from 30 to 99% (w/w) of γ-AlO(OH) and from 1 to 70% (w/w) of γ-$Al_2O_3$.

6. The dispersion according to claim 1, wherein the aluminum oxide nanofibers are free of aluminum trihydroxide.

7. The dispersion according to claim 1, wherein the aluminum oxide nanofibers are treated.

8. The dispersion according to claim 1, wherein the aluminum oxide nanofibers are untreated.

9. The dispersion according to claim 1, further comprising a dispersing agent.

10. The dispersion according to claim 9, wherein the dispersing agent is selected from a surfactant and a silicone resin.

11. A method of preparing an aluminum oxide dispersion, the method comprising:
    (i) heating a mixture comprising aluminum oxide fibers comprising from 0 to 99.99% (w/w) of γ-AlO(OH) and from 0.01 to 100% (w/w) of γ-$Al_2O_3$, water, and a carboxylic acid to produce a dispersion and a residue; and
    (ii) separating the dispersion from the residue, and
    wherein:
    the dispersion comprises aluminum oxide nanofibers suspended in the water,
    the aluminum oxide nanofibers comprise aluminum oxide fibrils and aluminum oxide aggregates with each aluminum oxide aggregate comprising two or more aluminum oxide fibrils, and
    the aluminum oxide aggregates have an average width of less than about 400 nm.

12. The method according to claim 11, further comprising, after step (ii), replacing at least a portion of the water in the separated dispersion with an organic solvent.

13. The method according to claim 11, further comprising, after step (ii) removing the carboxylic acid from the separated dispersion.

14. The method according to claim 11, further comprising, after step (ii), treating the separated dispersion with an organosilicon compound.

15. An aluminum oxide dispersion prepared according to the method of claim 11.

* * * * *